(12) United States Patent
Favero

(10) Patent No.: US 11,794,849 B2
(45) Date of Patent: Oct. 24, 2023

(54) PEDAL FOR BICYCLES

(71) Applicant: FAVERO ELECTRONICS S.R.L., Arcade (IT)

(72) Inventor: Gino Favero, Arcade (IT)

(73) Assignee: FAVERO ELECTRONICS S.R.L., Arcade (IT)

( * ) Notice: Subject to any disclaimer, the term of this patent is extended or adjusted under 35 U.S.C. 154(b) by 0 days.

(21) Appl. No.: 17/796,188

(22) PCT Filed: Mar. 8, 2021

(86) PCT No.: PCT/IB2021/051912
§ 371 (c)(1),
(2) Date: Jul. 28, 2022

(87) PCT Pub. No.: WO2021/234466
PCT Pub. Date: Nov. 25, 2021

(65) Prior Publication Data
US 2023/0051267 A1    Feb. 16, 2023

(30) Foreign Application Priority Data
May 21, 2020 (IT) .......................... 102020000011956

(51) Int. Cl.
*B62M 3/08* (2006.01)
*B62J 45/421* (2020.01)

(52) U.S. Cl.
CPC .............. *B62M 3/08* (2013.01); *B62J 45/421* (2020.02)

(58) Field of Classification Search
CPC ........ B62M 3/08; B62J 45/421; B62J 45/411; Y02T 10/70; Y02T 10/7072; Y02T 90/14
(Continued)

(56) References Cited

U.S. PATENT DOCUMENTS

| 11,001,327 B1 | 5/2021 | Santurbane et al. |
| 2010/0024590 A1 | 2/2010 | O'Neill et al. |

(Continued)

FOREIGN PATENT DOCUMENTS

| CN | 203497117 | 3/2014 |
| CN | 106476971 | 3/2017 |

(Continued)

OTHER PUBLICATIONS

Machine translation of FR 3078158 A1, Schoberer, Aug. 23, 2019 (Year: 2019).*

(Continued)

*Primary Examiner* — Vinh Luong
(74) *Attorney, Agent, or Firm* — MCCRACKEN & GILLEN LLC

(57) ABSTRACT

A pedal for bicycles includes a pedal pin that extends along a reference axis and has a first axial end structured to be coupled to a pedal crank of a bicycle and a second axial end opposite to the first end and a pedal body that comprises a hub coupled in a freely rotatable manner to the pedal pin so as to be able to rotate around the reference axis. On the pedal pin there are at least two inner chambers having a circular section and extending along the reference axis coaxial thereto, a sensor circuit coupled to the pedal pin, an electronic circuit configured to determine the mechanical deformation of the pedal pin, and an electric storage device arranged in an inner chamber.

19 Claims, 4 Drawing Sheets

(58) Field of Classification Search
USPC .......................................... 74/594.4, 594.6
See application file for complete search history.

(56) References Cited

U.S. PATENT DOCUMENTS

| | | |
|---|---|---|
| 2012/0166105 A1 | 6/2012 | Biermann et al. |
| 2012/0234108 A1 | 9/2012 | Janecek et al. |
| 2013/0024137 A1* | 1/2013 | Grassi ................. G01L 1/00 702/43 |
| 2014/0165779 A1* | 6/2014 | Chen ................. B62J 45/421 74/594.4 |
| 2014/0273543 A1* | 9/2014 | Hanshew ............. G01L 3/108 439/18 |
| 2016/0052584 A1 | 2/2016 | Sasaki |
| 2016/0209281 A1* | 7/2016 | Carrasco Vergara ... G01L 3/242 |
| 2016/0375953 A1* | 12/2016 | Chen ................. B62J 45/421 74/594.4 |
| 2017/0358731 A1 | 12/2017 | Fukuda et al. |
| 2018/0229799 A1 | 8/2018 | Lo |

FOREIGN PATENT DOCUMENTS

| | | | |
|---|---|---|---|
| CN | 207173874 | 4/2018 | |
| DE | 10007841 | 9/2001 | |
| DE | 202016000321 U1 * | 9/2016 | ............ G01L 5/22 |
| DE | 202018005992 | 3/2019 | |
| EP | 2299252 | 3/2011 | |
| EP | 2973891 | 9/2014 | |
| EP | 3299067 | 3/2018 | |
| EP | 3566937 | 11/2019 | |
| FR | 2914902 | 10/2008 | |
| FR | 3078158 | 8/2019 | |
| IT | TV2015A000010 | 1/2015 | |
| JP | 2008221880 | 9/2008 | |
| WO | 2008/109914 | 9/2008 | |
| WO | WO 2022018660 A1 * | 1/2022 | ............ B62J 45/411 |
| WO | 2022034497 | 2/2022 | |

OTHER PUBLICATIONS

International Seach Report and Written Opinion of the International Searching Authority, dated Jun. 7, 2021, in connection with International Application No. PCT/IB2021/051912 (14 pages).

Define relative, Microsoft Bing, Dec. 16, 2022 (Year: 2022) (4 pages).

Machine translation of FR 3078158 A1, Ulrich, Aug. 23, 2019 (Year: 2019) (7 pages).

* cited by examiner

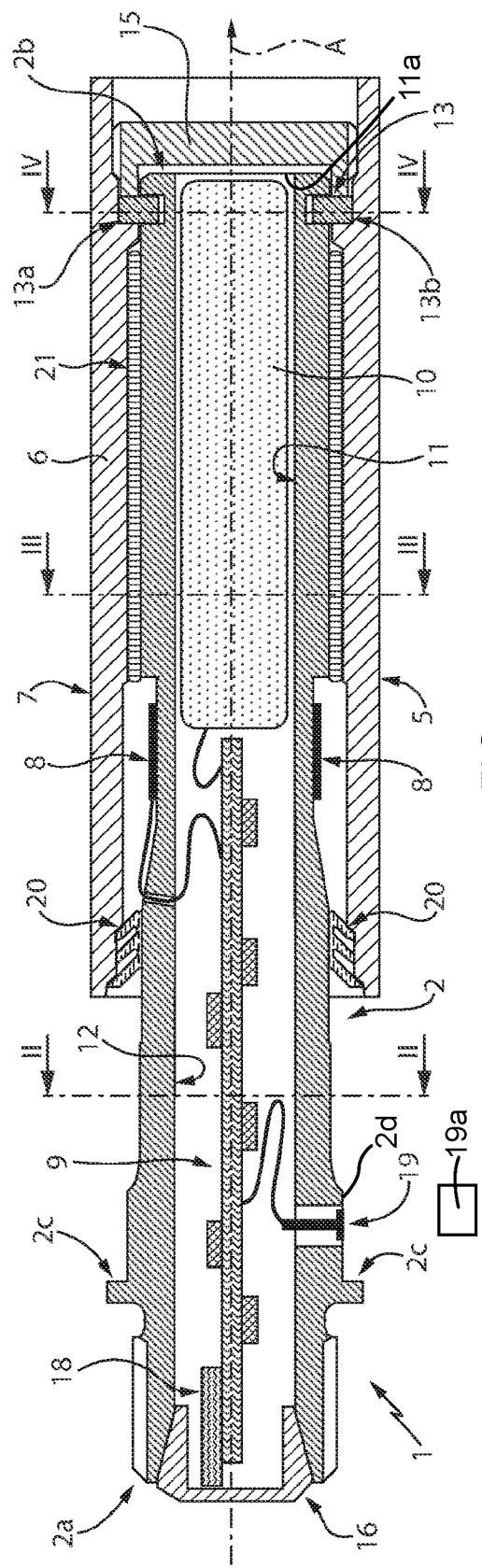
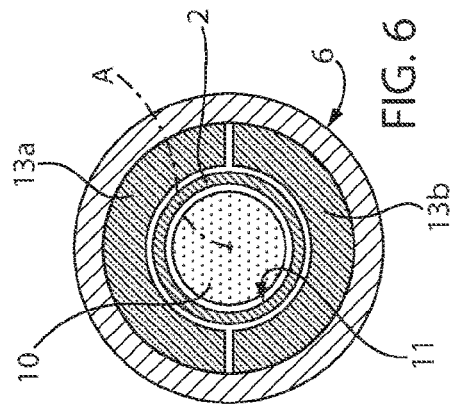
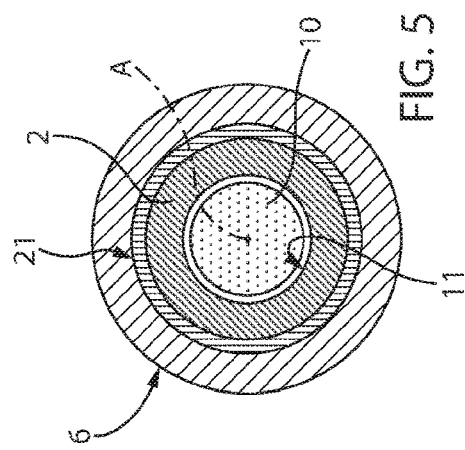
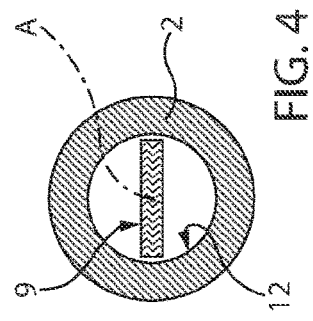

PEDAL FOR BICYCLES

CROSS-REFERENCE TO RELATED APPLICATIONS

This patent application claims priority from Italian patent application no. 102020000011956 filed on 21 May 2020, the entire disclosure of which is incorporated herein by reference.

TECHNICAL FIELD

The present invention relates to a pedal for bicycles. In particular, the present invention refers to a pedal for bicycles which is designed to measure the power exerted by a cyclist while pedaling.

BACKGROUND ART

The use in bicycles, especially racing/road bicycles, of measurement systems that determine and display a series of parameters/quantities useful for monitoring the physical activity carried out by the cyclist while pedaling, generally the force/power exerted on the pedal and pedaling cadence, is well known.

Electronic measurement systems typically comprise an electronic measurement device which is arranged on the pedal and provided with electronic circuits and boards which measure the aforementioned parameters and transmit the measured parameters in the form of data to a display device generally arranged at the front of the bicycle, which receives the data and shows it to the cyclist.

Some types of electronic measurement devices are fitted onto the pedal pin of the pedal in a position lateral to the pedal body so as to remain, completely or at least partially, outside the pedal pin itself.

An electronic measurement device of this type is for example the one described in Italian patent application no. TV2015A000010 filed by the Applicant.

A technical problem with electronic measurement devices of the type mentioned above is that their presence outside the pedal pin, especially in the area of the pedal, can be exposed to the risk of damage in case of accidental impacts.

Patent application FR 3 078 158 A1 describes an electronic device provided with two electric batteries arranged on respective flat surfaces obtained outside the pedal pin.

Patent application EP 2 973 891 A1 describes an electronic device provided with an electrical connector which is designed to connect the sensors to batteries arranged outside the pedal pin.

Patent application WO 2008/109914 describes an electronic device mounted in the central hub to which the two opposite pedal cranks connecting the pedals are coupled.

DISCLOSURE OF INVENTION

The object of the present invention is therefore to provide a solution for measuring the power exerted by a cyclist while pedaling, which is capable of overcoming the technical problem described above.

This object is achieved by the present invention in that it relates to a pedal for bicycles provided as defined in the appended claims.

BRIEF DESCRIPTION OF THE DRAWINGS

The present invention will now be described with reference to the accompanying drawings, which illustrate a non-limiting embodiment thereof, wherein:

FIG. 3 is the longitudinal section I-I of the pedal shown in FIG. 2, FIG. 4 is a section II-II of the pedal shown in FIG. 3, FIG. 5 is the section III-III of the pedal shown in FIG. 3, FIG. 6 is the section IV-IV of the pedal shown in FIG. 3.

BEST MODE FOR CARRYING OUT THE INVENTION

The present invention will now be described in detail with reference to the accompanying drawings in order to allow a skilled person to implement it and use it.

Various modifications to the described embodiments will be readily apparent to those skilled in the art and the general principles described may be applied to other embodiments and applications without however departing from the protective scope of the present invention as defined in the appended claims. Therefore, the present invention should not be regarded as limited to the embodiments described and illustrated herein, but they must be given the broadest protective scope consistent with the principles and features described and claimed herein.

The present invention is essentially based on the idea of forming inner chambers in the pedal pin which are specifically structured and sized so as to be able to easily accommodate on the inside all or most of the electrical and electronic components used for measuring the power, so as to conveniently use the pedal pin as an external protective container incorporating the same.

Figure 1:
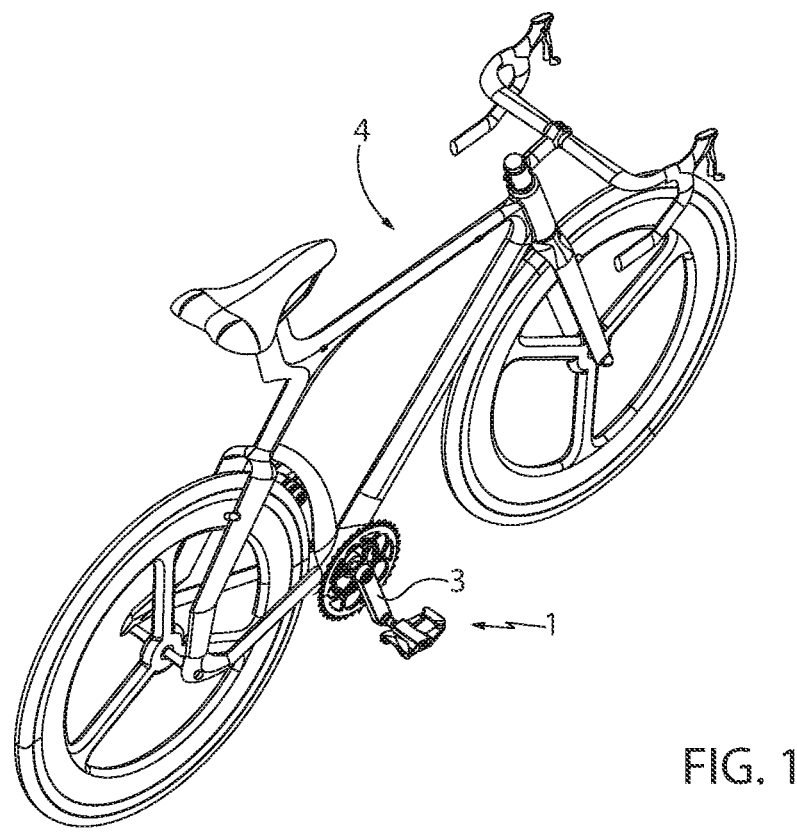
FIG. 1 schematically shows a bicycle equipped with a pedal provided according to the teachings of the present invention.
Figure 2:
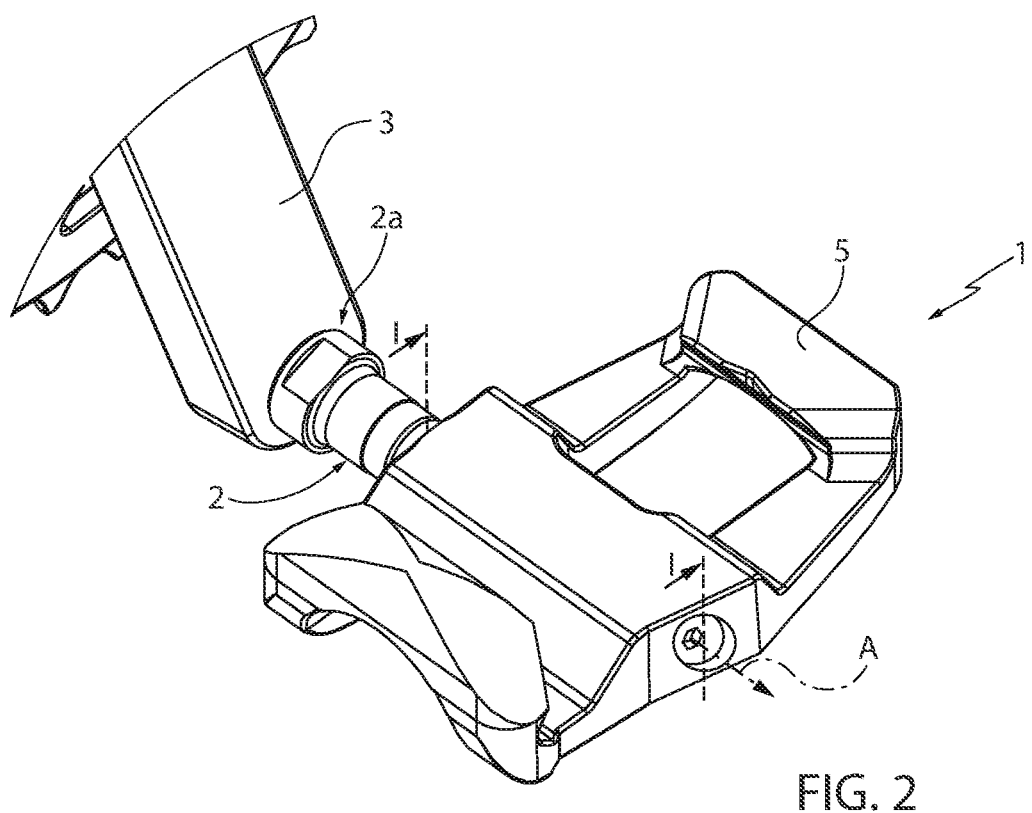
FIG. 2 is a perspective view in enlarged scale of the pedal shown in FIG. 1.

With reference to FIGS. 1, 2 and 3, number 1 indicates, as a whole, a pedal for bicycles, which is designed to measure electrical quantities indicative of the thrust on pedal of cyclist. The pedal 1 comprises a pedal pin 2, preferably made of metallic material, which extends along a longitudinal axis A and is structured for being coupled to a pedal crank 3 of a bicycle 4 (FIG. 1).

With reference to FIG. 3, the pedal pin 2 can have a first end 2a, which is preferably threaded and is coupled to the corresponding pedal crank 3 of the bicycle 4. The pedal pin 2 may preferably have an elongated cylindrical shape and extend cantilevered from the pedal crank 3 along the longitudinal axis A, preferably approximately orthogonal to the pedal crank 3, and has a second end 2b axially opposite to the end 2a. According to a preferred embodiment, the pedal pin 2 can have a length along the axis A comprised between approximately 70 mm and approximately 95 mm, preferably of approximately 90 mm.

According to the example shown in FIG. 3, the pedal pin 2 can comprise an annular crown or flange 2c coaxial with the axis A, which is positioned approximately on the inner side of the threaded portion of the end 2a and designed to be arranged in abutment against the pedal crank 3 when the pedal 1 is connected to said pedal crank 3.

The pedal 1 further comprises a pedal body 5, which is coupled in a freely rotatable manner to the pedal pin 2 so as to be able to rotate around the longitudinal axis A with respect to the pedal pin 2. The pedal body 5 comprises a tubular body, i.e., a hub 6 internally having an opening or hole, preferably a through hole of circular cross-section extending along the axis A. The hub 6 is preferably coupled by means of a bushing 21, or a bearing, in a freely rotatable way to the pedal pin 2, so as to be able to rotate around the longitudinal axis A. According to the example shown in FIG. 3, the bushing 21 or bearing is fitted onto the pedal pin 2 approximately in an intermediate position adjacent to the second end 2b.

In the example shown in FIG. 3, the pedal body 5 further comprises a foot-rest portion 7, which is firmly/rigidly connected to the hub 6, so as to preferably form a one-piece or monolithic body with it, and structured to form a support body for the cyclist's foot. For example, the foot-rest portion 7 can comprise an approximately plate-like structure that extends on a platform approximately parallel to the longitudinal axis A, on which, in use, the cyclist's foot rests. It should be understood that the shape/structure of the foot-rest portion 7 can be different from the plate-like one mentioned above and/or shown in the attached Figures. It should also be understood that the foot-rest portion 7 can preferably be shaped/structured so as to be connected/hooked to a cyclist's shoe by means of notches/studs (or cleats) of a known type, generally used on the pedals of racing or mountain bikes.

The pedal 1 further comprises a sensor circuit 8 provided with a series of sensors, preferably strain gauges coupled to the pedal pin 2; an electronic processing circuit 9 which is electrically connected to the sensor circuit 8 and is configured to determine, by means of the latter, the deformation of the pedal pin 2 caused by the force exerted by the cyclist on the pedal 1 and therefore on the pedal pin 2 while pedaling; and an electric storage device 10 designed to supply the electrical energy required for the operation of the processing circuit 9 and the sensor circuit 8.

Figure 7:
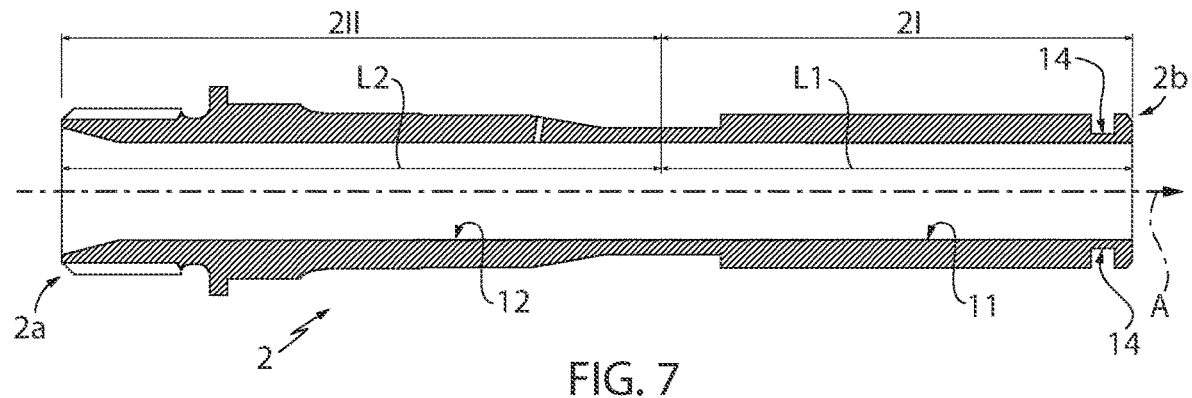
FIG. 7 is the vertical longitudinal section, with parts removed for clarity, of the pedal pin of the pedal shown in FIG. 3, FIGS. 8 and 9 show the vertical longitudinal section of as many variant embodiments of the pedal pin shown in FIG. 7.

According to the preferred embodiment shown in FIGS. 3 and 7, the electric storage device 10 is housed in an inner seat or chamber 11 which is obtained in a portion 2I of the pedal pin 2 adjacent to the second end 2b. Preferably, the electric storage device 10 comprises at least one substantially cylindrical, preferably rechargeable, battery which is preferably axially engaged in the inner chamber 11.

The inner chamber 11 is obtained in the portion 2I of the pedal pin 2 and extends axially along the axis A, starting from the second end 2b towards the first end 2a. Conveniently, the inner chamber 11 is obtained in the portion 2I of the pedal pin 2 and extends axially along the axis A below the bushing 21 (or bearing). In other words, the bushing 21 is fitted onto the pedal pin 2 so as to be approximately radially aligned with the chamber 11 thus surrounding it.

The Applicant has found that by using a bushing 21 or bearing having an internal diameter comprised between approximately 12 and approximately 15 mm and a thickness comprised between approximately 1 mm and approximately 3 mm it is possible to obtain, in the body of the pedal pin 2, a radial space which allows the diameter of the inner chamber 11 to be increased without impairing the functionality of the pedal 1.

In particular, the presence of the bushing 21 sized as described above allows an inner chamber 11 to be obtained on the pedal pin 2, the inner chamber 11 being sized so as to conveniently have an internal diameter comprised between approximately 7 mm and approximately 13 mm. Preferably, the inner chamber 11 is sized so as to have an internal diameter comprised between approximately 8 mm and approximately 13 mm.

The inner chamber 11 is also sized so as to have a length L1 along the axis A comprised between approximately 15 mm and approximately 40 mm.

Conveniently, the battery can therefore have an external diameter which depends on the internal diameter of the chamber 11. The diameter of the battery can be comprised between approximately 5.5 mm and approximately 13.0 mm. The technical effect obtained by the above-mentioned sizing of the inner chamber 11 is that of being able to house a rechargeable battery capable of supplying an amount of electrical energy comparable to that obtained in other models where the battery is located outside the pedal pin. The Applicant has also found that such a battery is capable of supplying sufficient electrical energy to operate the processing circuit 9 for a period of time greater than 40 hours in order to limit the number of recharges.

According to the preferred embodiment shown in FIGS. 3 and 7, the electronic processing circuit 9 is arranged in an inner chamber 12 which is obtained in a portion 2II of the pedal pin 2 adjacent to the first end 2a. The electronic processing circuit 9 may comprise an electronic board (PCB) which is sized so as to be housed in the inner chamber 12.

According to the preferred exemplary embodiment shown in FIGS. 3 and 7, the inner chamber 12 extends axially along the axis A, starting from the first end 2a towards the inner chamber 11. The length L2 of the inner chamber 12 along the axis A is conveniently comprised between approximately 25 mm and approximately 65 mm. The inner chamber 12 is also sized so as to conveniently have an internal diameter comprised between approximately 8 mm and approximately 13 mm.

The technical effect obtained by the above-mentioned sizing of the inner chamber 12 is that of being able to easily house the electronic board of the processing circuit.

According to a preferred embodiment shown in FIGS. 3 and 7, the two inner chambers 11 and 12 have a section transverse, i.e., orthogonal, to the circular axis A and are contiguous, that is, they have the adjacent inner ends connected together and communicating internally with one another so as to form a through-hole in the pedal pin 2.

In the example shown herein, the inner chamber 11 has an axial end 11a opposite the chamber 12, which is arranged at the end 2b, i.e., it has a zero distance from it.

It is however understood that the present invention is not limited to the zero distance between the end of the inner chamber 11 and the end 2b but provides that the axial end 11a of the inner chamber 11 opposite the first chamber 12 can be arranged at a distance less than approximately 25 mm from the end 2b of said pedal pin 2.

Preferably, the axial end 11a of the inner chamber 11 opposite the first chamber 12 can be conveniently located at a distance less than approximately 15 mm from the end 2b of said pedal pin 2.

In other words, the inner chamber 11 can extend into the pedal pin 2 starting from the end 2b (zero distance) or within a distance range of approximately 25 mm, preferably 15 mm, measured from the end 2b towards the opposite end 2a.

Figure 8:
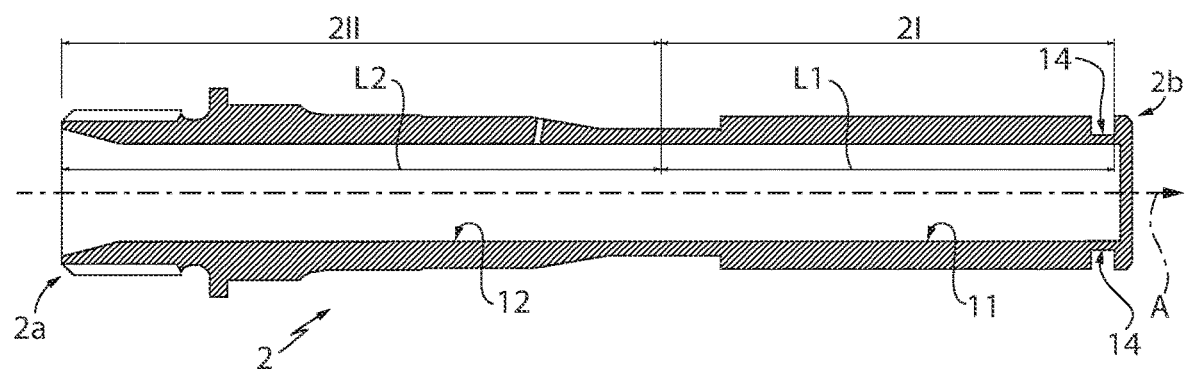

It is however understood that the present invention is not limited to two inner chambers 11 and 12 defining a through-hole which has openings at the ends 2a and 2b but may provide other solutions. For example, according to the variant embodiment shown in FIG. 8, the chamber 11 and the chamber 12 are centrally connected so as to form a blind hole which has a single opening formed at the end 2a of the pedal pin 2 towards the pedal crank 3.

Figure 9:
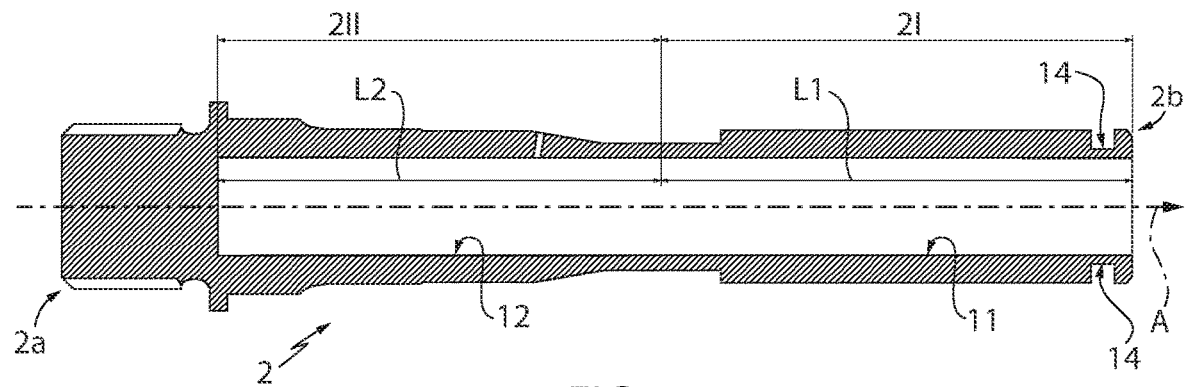

According to a further embodiment shown in FIG. 9, the chamber 11 and the chamber 12 are centrally connected so as to form a blind hole which has a single opening formed at the end 2b of the pedal pin 2 on the opposite side with respect to the pedal crank 3.

According to a preferred exemplary embodiment shown in FIG. 3, the two inner chambers 11 and 12 have the same internal diameter. It is however understood that the present invention is not limited to two chambers 11 and 12 having the same internal diameter but can provide that the two chambers 11 and 12 have diameters different from each other but within the above-described ranges.

It is also understood that the present invention is not limited to two chambers 11 and 12 having a constant diameter, but each can have a variable diameter along the axis A.

According to the preferred embodiment shown in FIG. 3, the sensor circuit 8 is arranged on the outer surface of the pedal pin 2 and comprises deformation sensors, preferably strain gauges connected together according to a Wheatstone bridge electrical configuration. The sensor circuit 8 is designed to measure changes in electrical quantities indicative of the mechanical deformations caused by the cyclist on the pedal pin 2 while pedaling.

It is understood that the present invention is not limited to the positioning of the sensor circuit 8 on the pedal pin 2 (outside the same) but can provide other solutions, one of which can provide the positioning of the sensor circuit 8 in the inner chamber 12 and/or in the inner chamber 11.

According to the preferred embodiment shown by way of example in FIG. 3, the sensor circuit 8 is positioned on the outer surface portion of the pedal pin 2 which is adjacent to the bushing 21 and arranged below a portion of the pedal body 5 whose end, opposite the end 2b, is closed by an annular gasket 20 fitted onto the pedal pin 2. The sensor circuit 8 can be electrically connected to the processing circuit 9 through a series of wires which pass through one or more through-holes radially obtained on the pedal pin 2 at the inner chamber 11 and/or the inner chamber 12.

According to the preferred embodiment shown in FIG. 3, the pedal 1 further comprises a mechanical clamping member 13 which is structured so as to axially clamp the hub 6 of the pedal body 5 to the pedal pin 2 in order to prevent the pedal body 5 from slipping off of the pedal pin 2 along the axis A.

According to an exemplary embodiment shown in FIGS. 3 and 7-11, an annular seat 14 coaxial with axis A is obtained on the pedal pin 2. The annular seat 14 on the inside has a cylindrical bottom wall and two side walls which define two annular shoulders on the pedal pin 2.

According to the embodiment shown in FIGS. 3 and 7-11, the annular seat 14 and the corresponding annular shoulders are formed on the edge of the pedal pin 2 adjacent to the end 2b.

In the example shown in FIG. 3, the mechanical clamping member 13 further comprises two distinct and independent semi-annular bodies 13a and 13b having cross sections in the form of semi-circular segments preferably approximately complementary to each other and to the annular seat 14.

The two semi-annular bodies 13a and 13b are arranged in the annular seat 14 so as to be able to rotate therein around the axis A with respect to the pedal pin 2. The two semi-annular bodies 13a and 13b are structured so as to preferably abut against the annular shoulders of the annular seat 14 so as to remain axially clamped and not to be able to move with respect to the pedal pin 2 along the axis A. The two semi-annular bodies 13a and 13b radially project from the seat 14 and are arranged in abutment against an inner annular shoulder of the hub 6, which is, in turn, interposed between the seat 14 and the axial end of the bushing 21.

According to the preferred embodiment shown in FIG. 3, the pedal 1 further comprises a closing cap 15 which is connected to the end of the hub 6 opposite the pedal crank 3. The closing cap 15 may be in the form of a threaded cup-shaped body which is screwed onto the threaded edge of the hub 6 so as to abut against the projecting portion of the semi-annular bodies 13a and 13b. The closing cap 15 axially retains the hub 6 so as to lock the axial movement of the hub 6 towards the pedal crank 3.

According to the preferred embodiment shown in FIG. 3, the opening of the inner chamber 12 obtained at the end 2a is closed by a closing cap 16. The closing cap 16 can be in the form of a cup-shaped body and be engaged, for example by means of a snap-locking or gluing system, onto the end 2a in the opening of the inner chamber 11, thus closing it.

According to the preferred embodiment shown in FIG. 3, the processing circuit 9 can comprise a radio communication module 18 designed to transmit/receive radio-frequency signals for data transmission. The Applicant has found that the positioning of the radio communication module 18 at the end 2a of the pedal pin reduces the attenuation of the radio signals caused by the metal body of the pedal pin 2 itself.

According to the preferred embodiment shown in FIG. 3, the pedal 1 further comprises an electric charging connector 19 arranged on the pedal pin 2. The electric charging connector 19 is preferably arranged on a free outer surface portion 2d of the pedal pin 2 exposed from said pedal body 5 and is structured to carry out the electric charging of the electric storage device 10.

The electric charging connector 19 can be conveniently provided with a magnetic coupling system for enabling the coupling of the electric connector 19 with an electric charging connector of an external electric power supply 19a. For example, the electric charging connector 19 can be provided with a magnetic element, or alternatively can be made at least partly of ferromagnetic material.

The pedal described above has the advantage of using the pedal pin as a housing for containing the electrical/electronic components, thus eliminating their encumbrance outside the pin and the risk of damage thereto.

In fact, the Applicant has found that the sizing of the pedal pin and its inner chambers according to the combination of sizes described above has the technical effect, on the one hand, of not causing structural weakening in the pedal pin, and on the other, of creating inner chambers having sufficient space to house on the inside both the batteries and the electronic circuits.

It should be emphasized that this technical effect is not achieved by the state-of-the-art pedals.

For example, FR 3 078 158 A1 addresses the technical problem of the visibility of the measuring elements outside the pedal. In particular, FR 3 078 158 A1 describes that the pedal pin of a pedal is generally difficult to work for the integration of force sensors due to its structural weakening, and thus teaches a solution opposite to that of the present invention, that is to provide flat surfaces for supporting the batteries on the outer surface of the pedal pin, which therefore remain outside the pedal pin and inside the pedal body so as not to be externally visible.

The solution described in EP 2973 891 A1 provides a solution completely opposite to the present invention since it teaches to position the batteries in a position completely external to the pedal pin, at the end thereof.

Finally, WO 2008 109 914 A2 relates neither to a pedal nor to a pedal pin but to a central movement hub to which the pedal cranks are connected. Furthermore, WO 2008 109 914 A2 does not address or solve the technical problem of the weakening of the structure of the pedal pin for the construction of inner chambers. In this connection, it should be pointed out that the hub, as it has a structure and size completely different from those of a pedal pin, does not have the structural issues of a pedal pin.

Lastly, it is clear that modifications and variations may be made to the above-described pedal without however departing from the scope of the present invention.

Figure 10:
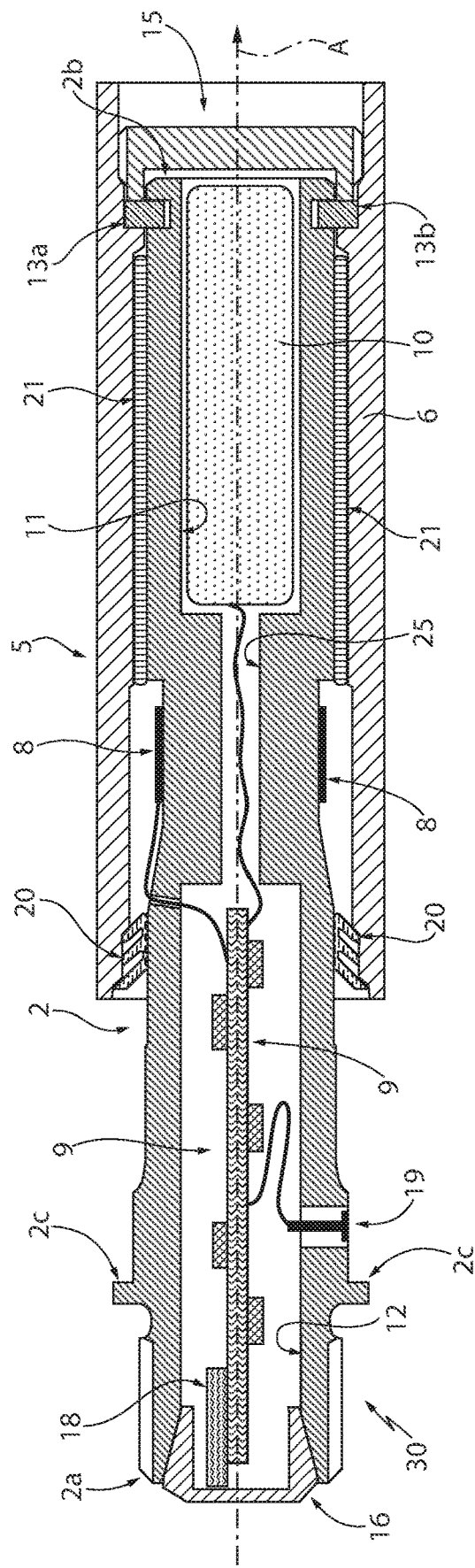
FIG. 10 is the vertical longitudinal section of the pedal according to a variant embodiment.
Figure 11:
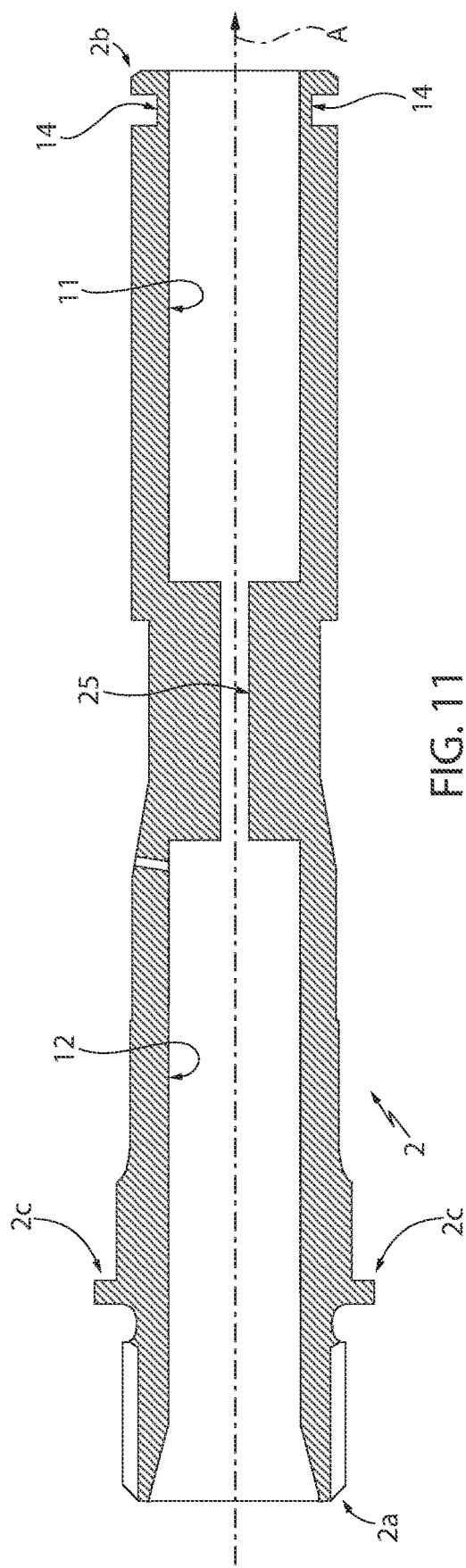
FIG. 11 is a vertical longitudinal section of the pedal pin of the pedal shown in FIG. 10.

The embodiment shown in FIGS. 10 and 11 relates to a pedal pin 30, which is similar to the pedal 1 shown in FIG. 3, and whose parts will be identified, where possible, with the same reference numbers that identify corresponding parts of the pedal 1.

The pedal 30 shown in FIGS. 10 and 11 differs from the pedal 1 in that the pedal pin 2 centrally comprises an additional inner chamber 25, which connects the inner chamber 12 to the inner chamber 11 and houses connecting wires that connect the processing circuit 9 to the electric storage device 10.

According to a different embodiment (not shown) alternative to the embodiments shown in FIGS. 3 and 10, the pedal differs from the pedals 1 and 30 in that it has the processing circuit 9 positioned in the inner chamber 11 and the electric storage device 10 arranged in the inner chamber 12.

The invention claimed is:

1. A pedal for bicycles comprising:
    a pedal pin which extends along a reference axis and has a first axial end structured to be coupled to a pedal crank of a bicycle and a second axial end opposite to said first end,
    a pedal body which comprises a hub coupled in a freely rotatable manner to said pedal pin in order to be able to rotate around said reference axis,
    at least two inner chambers which have a circular section and are formed in said pedal pin and extend along said reference axis coaxial thereto,
    sensor means comprising at least one sensor coupled to said pedal pin and designed to detect an electric parameter indicative of the mechanical deformation thereof,
    electronic means comprising an electronic processing circuit and configured to determine, through said sensor means, the mechanical deformation of the pedal pin caused by the force exerted by the cyclist on the pedal pin during the pedaling,
    electric storage means comprising an electric storage device and arranged within at least one of said inner chambers and are designed to electrically power said electronic means,
    and wherein
    a first chamber is formed in the pedal pin so as to extend along said reference axis starting approximately from the first end towards the second end,
    a second inner chamber is formed in the pedal pin so as to extend along said reference axis between the first inner chamber and the second end,
    said second inner chamber being sized so as to have:
    a length between approximately 15 mm and approximately 40 mm,
    an internal diameter between approximately 7 mm and approximately 13 mm, and
    an axial end opposite to the first chamber, which is arranged at a distance of less than approximately 25 mm from said second end of said pedal pin.

2. The pedal according to claim 1, wherein said first inner chamber extends in the pedal pin so as to have a length comprised between approximately 25 mm and approximately 65 mm, and has an internal diameter comprised between approximately 8 mm and approximately 13.0 mm.

3. The pedal for bicycles according to claim 1, wherein said first chamber has an opening on said first end.

4. The pedal for bicycles according to claim 1, wherein said second chamber has an opening on said second end.

5. The pedal for bicycles according to claim 1, wherein said first and second chambers have the adjacent axial ends connected to one another in order to communicate with one another.

6. The pedal for bicycles according to claim 1, comprising a third chamber which is obtained at the centre of the pedal pin so as to extend from the first chamber to the second chamber thus connecting them and keeping them in communication with one another.

7. The pedal for bicycles according to claim 1, wherein said first chamber and said second chamber are formed in the pedal pin such as to form a through-hole.

8. The pedal for bicycles according to claim 1, wherein said first chamber and said second chamber are formed in the pedal pin so as to form a blind hole.

9. The pedal for bicycles according to claim 1, wherein said electronic means are arranged in said first chamber and/or in the second chamber.

10. The pedal for bicycles according to claim 1, wherein said sensor means are arranged in said first chamber and/or in said second chamber.

11. The pedal for bicycles according to claim 1, wherein said electric storage means comprise a cylindrical electrical battery that has an external diameter comprised between approximately 5.5 mm and approximately 13.0 mm.

12. The pedal for bicycles according to claim 1, comprising a bushing or a bearing interposed between said hub and said pedal pin; said bushing or bearing is fitted onto the pedal pin so as to be approximately radially aligned with said second chamber thus surrounding the second chamber.

13. The pedal for bicycles according to claim 12, wherein said bushing or bearing has an internal diameter comprised between approximately 12 mm and approximately 15 mm, and a thickness comprised between approximately 1 mm and approximately 3 mm.

14. The pedal for bicycles according to claim 13, wherein said bushing or bearing has a length comprised between approximately 25 mm and approximately 40 mm.

15. The pedal for bicycles according to claim 1, wherein said pedal pin has a free outer surface exposed from said pedal body and comprises an external electric charging connector which is structured to allow the electrical charging of said electric storage means and is arranged on said exposed outer surface.

16. The pedal for bicycles according to claim 15, wherein said electric charging connector comprises a magnetic element for enabling the coupling of said electric charging connector with an electric charging connector of an external electric power supply.

17. The pedal for bicycles according to claim 1, wherein said second inner chamber has an internal diameter comprised between approximately 8 mm and approximately 13 mm.

18. The pedal for bicycles according to claim 1, wherein said second inner chamber has an axial end opposite to the first chamber, which is arranged at a distance of less than approximately 15 mm from said second end of said pedal pin.

19. The pedal for bicycles according to claim 1, wherein the electric storage means are disposed in the second chamber.

* * * * *